(No Model.) 2 Sheets—Sheet 1.
F. W. KREMER.
OATMEAL CUTTER.
No. 297,523. Patented Apr. 22, 1884.
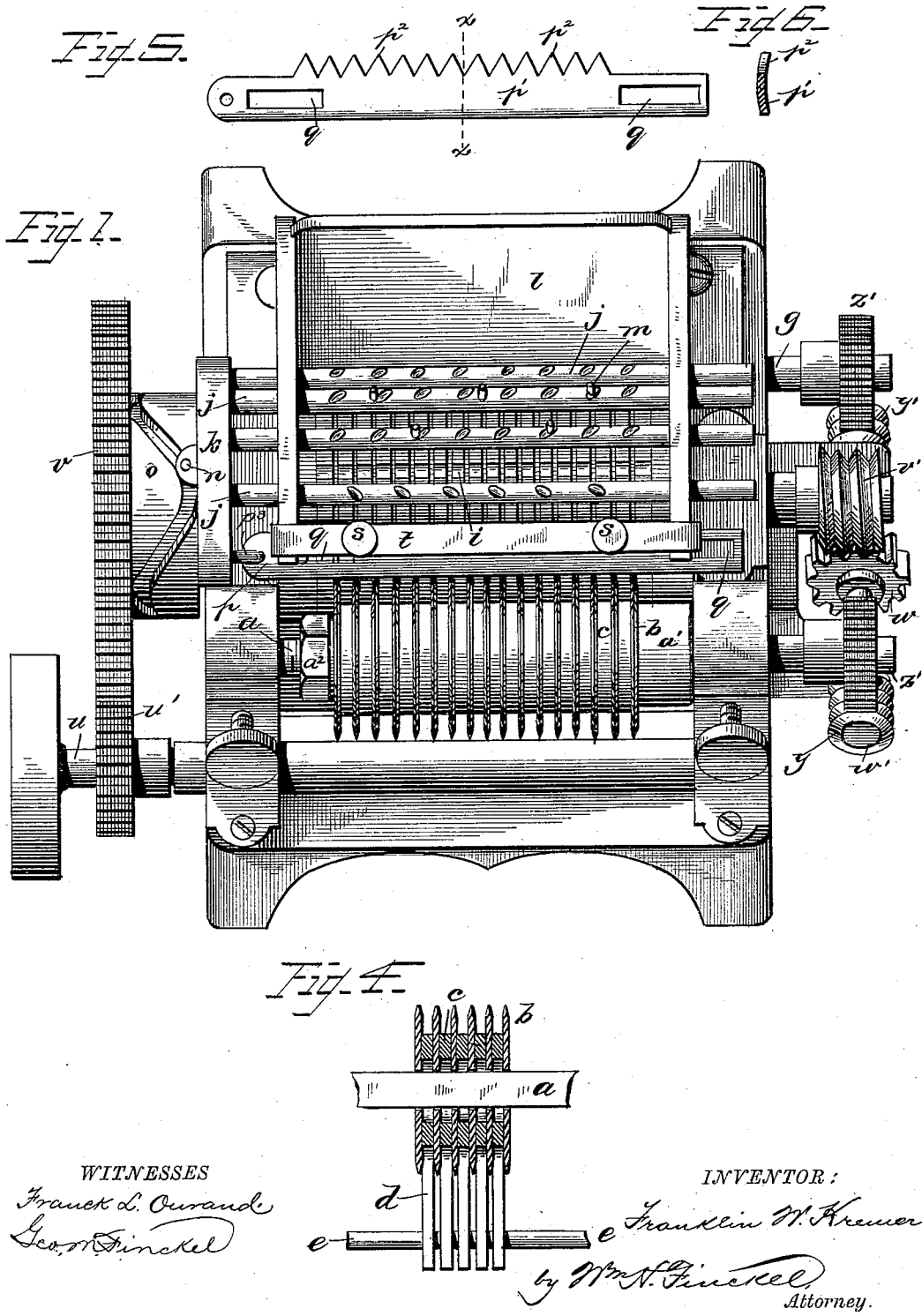

(No Model.) 2 Sheets—Sheet 2.
F. W. KREMER.
OATMEAL CUTTER.
No. 297,523. Patented Apr. 22, 1884.
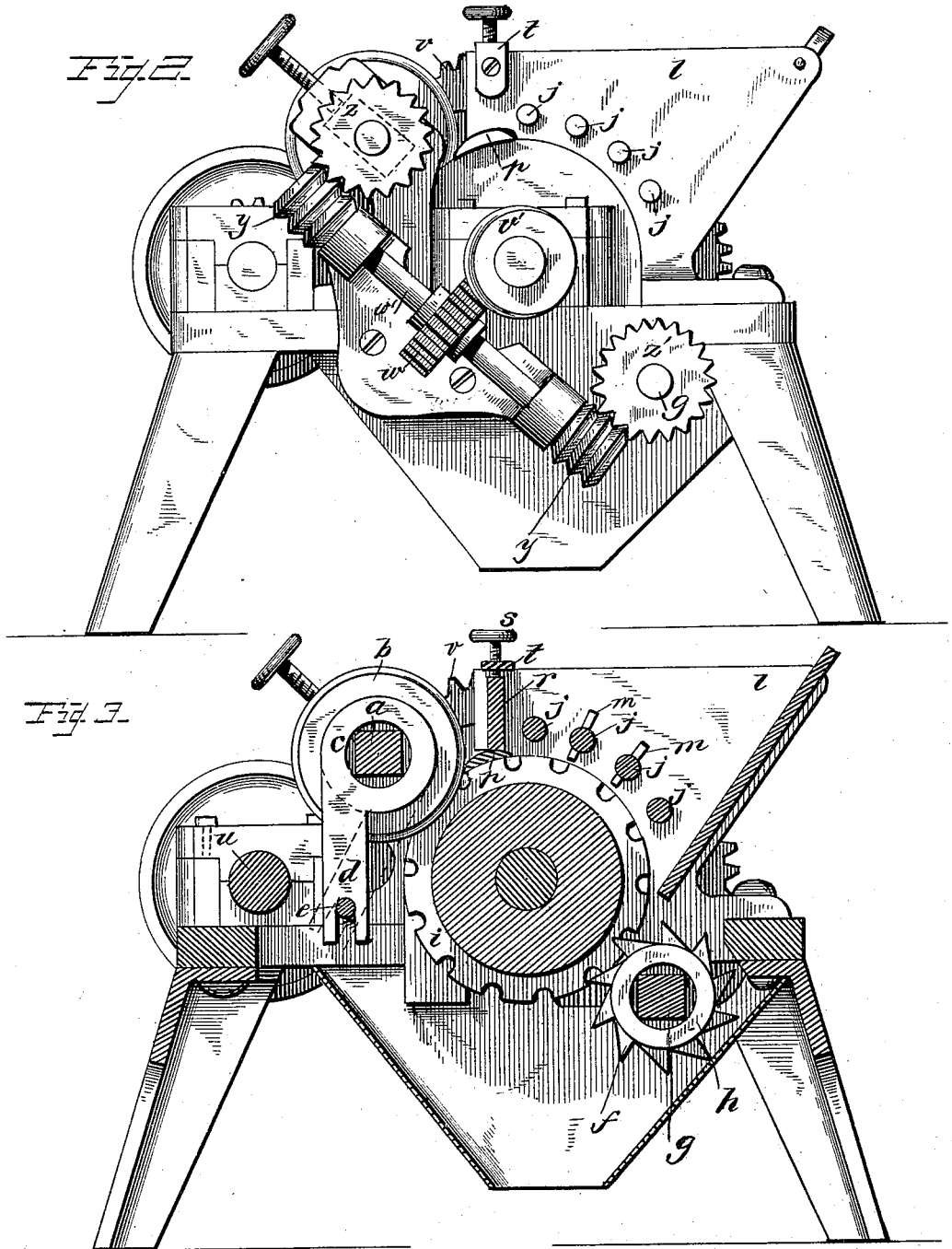
WITNESSES
INVENTOR:
Franklin W. Kremer
by Wm N. Finckel
Attorney

UNITED STATES PATENT OFFICE.

FRANKLIN W. KREMER, OF WADSWORTH, OHIO.

OATMEAL-CUTTER.

SPECIFICATION forming part of Letters Patent No. 297,523, dated April 22, 1884.

Application filed December 17, 1883. (No model.)

*To all whom it may concern:*

Be it known that I, FRANKLIN W. KREMER, a citizen of the United States, residing at Wadsworth, in the county of Medina and State of Ohio, have invented certain new and useful Improvements in Oatmeal-Cutters, of which the following is a full, clear, and exact description.

This invention is in the nature of improvements in that class of machines for reducing oats to what is commonly known as "oatmeal," and in which a rotary grooved or discous cutting device is employed in connection with a rotary feeding device.

The improvements consist in the cutting mechanism, the rotary clearing device, and the feeding mechanism, combined and arranged substantially as hereinafter specifically set forth and claimed.

In the accompanying drawings, illustrating my invention, in the several figures of which like parts are similarly designated, Figure 1 is a top plan view; Fig. 2, a side elevation; Fig. 3, a central vertical longitudinal section; Fig. 4, a longitudinal section of part of the cutter; Fig. 5, a plan view of a modification of part of the feeder, and Fig. 6 a section of the latter on the line $x\ x$.

My invention is designed to overcome objections found by me to exist in this class of machines, and as to the cutter: Where the knives are stationary, either straight or circular, the fine flour produced by the crushing of the grain in the feeding-cylinder grooves will get into the spacing of the knives and crowd them against the feeding-cylinder sidewise to such an extent as to make sufficient friction, as the cylinder rotates, to heat the knives enough to destroy their temper, warp, and otherwise injure them. Where, as in Patent No. 264,449, in connection with a discous feeder, rotary knives are used provided with clearing-fingers of sheet metal, the knives are clamped and rigidly held, and any irregularity of the disks of the feeding-cylinder will make unequal wear on them. I have found that giving a certain play to the cutters or knives will obviate this last-named objection, and that separating the knives or cutters by armed washers intersecting the knife-edges will overcome the first difficulty. I therefore provide a knife or cutter shaft, $a$, squared where it is to receive the circular discous cutters $b$, said cutters having squared holes to fit such shaft. Between these cutters, and separating them, I arrange washers $c$, having round holes in them, so as not to be acted upon by the shaft $a$, which they encircle, and these washers have arms $d$ projecting, say, tangentially from them, which are parallel with the sides and intersect the cutting-edges of the cutters, to clear the cutters of adhering flour, and they are held against displacement by frictional contact with the knives, or otherwise, by means of a rod, $e$, engaged by their notched ends. The knives or cutters and their washers are loose upon the shaft $a$, so as to permit free lateral movement, to render the knives self-adjusting with respect to the feeding-cylinder, so as to compensate for any irregularity in such cylinder. The arms $d$ of the washers may extend down vertically to the rod $e$, on the far side of the knife-shaft, with respect to the feeding-cylinder; or they may extend thereto diagonally from the near side, as indicated by dotted lines, Fig. 3. The shaft $a$ is mounted in suitable adjusting or compensating bearings on a proper frame-work, (not original with me,) to adjust the proximate relations of the cutters and feeder, and said shaft is slowly rotated in any suitable manner, as by worm-gearing, hereinafter specified. The rod $e$ is secured to said frame substantially in the relation indicated in Fig. 3.

Heretofore considerable difficulty has been experienced in keeping the grooves of grooved or discous feeders free of dust and flour, and means have been devised for effecting such clearance, which I have found not altogether satisfactory.

I have devised a slowly-rotated saw-toothed clearer, which overcomes the difficulties I have experienced. This clearer consists of a series of circular plates, $f$, with large and dull teeth. These plates or clearers have square holes to fit on a squared shaft, $g$, borne by the frame-work, and they are separated by annular washers $h$. The teeth of these clearers enter the annular grooves of the feeder and keep them clear, and as each clearer is provided with a number of teeth it is immaterial if one or more break, as it is hardly possible any one clearer could become toothless before attracting attention and allowing replacement. This clearer is caused to rotate in a direction opposite that of the feeder-cylinder. So, also, is the cutter, or otherwise, if desired. The output or capacity of the machine depends very largely on the construction of the feeder. In my machine I employ a longitudinally and circumferentially grooved feeding-cylinder, $i$, which may be made of a number of disks separated by washers, or may be of other approved construction. In connection with this feeder I employ a grating, consisting of a number of parallel bars, $j j$, secured to a head, $k$, and arranged in bearings in the hopper $l$ and longitudinal of the feeder-cylinder, directly over it, and parallel with its longitudinal grooves. These bars are far enough apart to permit the grain to fall between them into the feeder-cylinder, and they are preferably provided with pins or agitators $m$, to insure the distribution of the grain in the event of the grating of bars becoming covered with grain to any considerable extent. The head $k$ of the grating is provided with a friction-roller on a pin, $n$, which engages a serpentine cam, $o$, on the shaft of the feeder-cylinder, by means of which the grating receives a quick reciprocating movement over the feeder. This mechanism insures a very perfect filling of the grooves with grain, extending lengthwise of the grooves.

In connection with the grating I employ a blade, $p$, secured loosely, as by a hook, $p^3$, to the head $k$, and reciprocating with such grating. This blade is finished to the curvature of the feeder-cylinder, and is arranged to cover the space between the cylinder and cutters, being held in place by pins from the framing entering slots $q$ in the blade and by a movable pressure-board, $r$, forming the end of the hopper, and temper-screws $s$ in a bar, $t$, fast to the hopper, engaging the same to adjust it and prevent its rising. This blade $p$ has its side next the feeder-cylinder edged, so that any grain brought to it standing on end will be by it cut with a draw cut. By thus cutting such standing oats much of the flouring of the standing grain by crushing, as heretofore, is obviated. If this blade should not cut the standing grains, its motion against them will throw them down lengthwise in the longitudinal grooves, to be cut by the rotary knives. Instead of this blade, I may employ the device shown in Figs. 5 and 6, which consists of a blade, $p'$, arranged similarly to the blade $p$, but having, instead of a cutting-edge, a number of non-cutting teeth, $p^2$, like saw-teeth, standing out from its edge next the feeder-cylinder, and serving, when reciprocated, to knock the standing grains down into the longitudinal grooves. Such a device differs from the bars having fingers heretofore sometimes employed, in that its teeth are much shorter than such fingers, and engage the grains after they are in the feeder-cylinder and at a point within the hopper and just before reaching or in front of the cutters. As the knives are reduced in diameter by grinding, they may be adjusted up to the feeder by the compensating-bearings, hereinbefore referred to.

The parts are geared together for motion very conveniently by a driving-shaft, $u$, having a pinion, $u'$, which meshes with a gear-wheel, $v$, on the feeder-cylinder shaft. The other end of the feeder-cylinder shaft has a worm, $v'$, which meshes with a worm-wheel, $w$, on a counter-shaft, $w'$, and this counter-shaft has right and left worms $y y'$, which engage worm-wheels $z z'$ on the shafts, respectively, of the cutter-shaft and the clearer-shaft. The timing is such as to give the cutter and clearer shafts one revolution to, say, the hundred of the feeder-cylinder, and this will be sufficient to prevent the knives from being unduly heated at any one point, and also to insure the clearing of the grooves of the cylinder.

The knives and washers of the cutter are properly held upon the shaft $a$ by a collar, $a'$, at one end and a nut, $a^2$, or equivalent, at the other.

The direction of rotation of the clearers and cutters with relation to the feeder-cylinder is largely optional.

The arms $d$ of the washers $c$ serve as clearers for the knives $b$.

What I claim is—

1. The knife or cutting mechanism composed of a shaft, circular cutters loosely secured thereon, to turn with the shaft, and interposed separating-washers having projecting arms intersecting the peripheries of the cutters, substantially as and for the purpose described.

2. The combination, in an oatmeal-machine, with the squared shaft and means to rotate the same, of circular knives arranged to turn with the said shaft, and having lateral play thereon, the interposed non-rotating washers, and their projecting arms intersecting the acting edges of the knives, substantially as and for the purpose described.

3. In an oatmeal-machine, the combination, substantially as shown and described, of a longitudinally and circumferentially grooved feeding-cylinder, means to rotate the same at a given speed, a shaft, circular cutters loose on and turning with said shaft, stationary washers separating said cutters, arms projecting from said washers and intersecting the cutting-edges of the cutters, and means to rotate said shaft at a much-diminished speed relative to that of the feeding-cylinder, as and for the purpose set forth.

4. The combination, substantially as shown and described, of a feeding-cylinder having circumferential grooves, a cutting mechanism, a clearing device composed of a series of toothed circular plates, the teeth of which enter and clear said grooves, a shaft on which said plates are secured and properly spaced, a worm-wheel on said shaft, and worm-gearing connecting said shaft with the feeding-cylinder shaft, from which it and the cutting mechanism receive slow rotations, as set forth.

5. The combination, substantially as shown and described, of the hopper, a feeding-cylinder therein grooved longitudinally, a cutting mechanism, a series of bars and pins therein, a head to which said bars are connected, a blade also attached to said head and arranged over and between the feeding-cylinder and cutting mechanism to operate upon grains standing on end in the grooves, and means to rotate said cylinder and feeding mechanism and reciprocate said bars and blade.

6. The combination, with the hopper and feeding-cylinder, of a blade arranged over the feeding-cylinder next its discharge side, means to reciprocate it, a pressure-board over the same, and temper-screws to hold the board down on the blade, substantially as shown and described.

7. The combination and arrangement, substantially as shown and described, of the framing, a driving-shaft on the same, a hopper, a longitudinally and circumferentially grooved feeding-cylinder, a shaft carrying circular cutters separated by non-rotating cutter-clearing washers, a shaft carrying a series of circular toothed plates, a grating or series of grain-distributing bars, and a blade arranged over the feeding-cylinder, a cam on the cylinder-shaft, gearing connecting said shaft and the driving-shaft, and the series of worms and worm-wheels connecting the shafts of the cutting and clearing shafts with the cylinder-shaft.

In testimony whereof I have hereunto set my hand this 10th day of December, A. D. 1883.

FRANKLIN W. KREMER.

Witnesses:
W. M. CODDING,
JOHN A. CLARK.